United States Patent
Lan et al.

(10) Patent No.: US 11,304,512 B2
(45) Date of Patent: Apr. 19, 2022

(54) TRANSFER SLEEVE

(71) Applicant: SYNCMOLD ENTERPRISE CORP., New Taipei (TW)

(72) Inventors: Kang-Chen Lan, New Taipei (TW); Chun-Hao Huang, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 17 days.

(21) Appl. No.: 16/903,027

(22) Filed: Jun. 16, 2020

(65) Prior Publication Data
US 2020/0390235 A1    Dec. 17, 2020

Related U.S. Application Data

(60) Provisional application No. 62/862,350, filed on Jun. 17, 2019.

(30) Foreign Application Priority Data

Feb. 25, 2020    (TW) .................................. 109202062

(51) Int. Cl.
*F16M 13/02*    (2006.01)
*A47B 21/04*    (2006.01)

(52) U.S. Cl.
CPC ............. *A47B 21/04* (2013.01); *F16M 13/02* (2013.01); *A47B 2200/0084* (2013.01); *F16M 2200/06* (2013.01)

(58) Field of Classification Search
CPC .. F16M 13/022; F16M 11/08; F16M 11/2014; F16M 2200/08; A47B 21/04; A47B 2200/0085
See application file for complete search history.

(56) References Cited

U.S. PATENT DOCUMENTS

| | | | | |
|---|---|---|---|---|
| 7,733,645 B2 * | 6/2010 | Hsu | .......................... | H05K 5/02 |
| | | | | 361/679.59 |
| 9,316,346 B2 * | 4/2016 | Lau | ....................... | F16M 13/022 |
| 9,746,128 B2 * | 8/2017 | Huang | ................... | F16M 11/22 |
| 10,066,785 B1 * | 9/2018 | Chen | .................. | F16M 11/2014 |
| 10,436,244 B2 * | 10/2019 | Hung | .................. | F16M 11/2092 |
| 2011/0315843 A1 * | 12/2011 | Hung | ................... | F16M 11/041 |
| | | | | 248/279.1 |
| 2012/0025037 A1 * | 2/2012 | Chang | ................ | F16M 11/2014 |
| | | | | 248/124.1 |
| 2020/0191321 A1 * | 6/2020 | Kleist | ..................... | F16M 11/14 |
| 2020/0248865 A1 * | 8/2020 | Huang | ................... | F16M 11/20 |
| 2020/0292125 A1 * | 9/2020 | Collins | ................... | F16B 7/182 |
| 2020/0347858 A1 * | 11/2020 | Huang | ................... | F16M 11/24 |
| 2020/0363010 A1 * | 11/2020 | Huang | ................. | F16M 11/041 |
| 2021/0108757 A1 * | 4/2021 | Ho | ......................... | F16M 11/08 |

* cited by examiner

*Primary Examiner* — Bradley Duckworth
(74) *Attorney, Agent, or Firm* — Muncy, Geissler, Olds & Lowe, PC

(57) ABSTRACT

A transfer sleeve is disclosed, wherein the transfer sleeve is detachably set on a supporting unit for mounting a supporting arm. The transfer sleeve comprises a first tube body and a second tube body. The supporting unit is accommodated in the first tube body and the second tube body when the transfer sleeve is set on the supporting unit; the first tube body penetrates through the supporting arm when the supporting arm is set on the transfer sleeve.

10 Claims, 6 Drawing Sheets

TRANSFER SLEEVE

CROSS REFERENCE TO RELATED APPLICATION

This application claims the benefit of U.S. Provisional Application Ser. No. 62/862,350 filed on Jun. 17, 2019, and the benefit of Taiwan Patent Application Serial No. 109202062 filed on Feb. 25, 2020. The entirety of each Application is incorporated herein by reference.

BACKGROUND OF THE INVENTION

1. Field of the Invention

The present invention relates to a transfer sleeve. More particularly, the present invention relates to a transfer sleeve set on a transfer mount penetrating a desktop for mounting a support arm, which is supporting a display.

2. Description of Related Art

Conventionally, a supporting arm bearing a display is set on a desktop through a supporting unit which penetrates through a hole of the desktop and clamps two sides of the desktop. Then the supporting arm is mounted to the supporting unit. However, when changing the display with different weight or different supporting type, the supporting arm must be removed from the supporting unit and then the supporting unit must be removed from the desktop for installing another supporting unit on the desktop and another supporting arm on the supporting unit. Thus, the operation of the transfer mount is less convenient for the users.

The present invention provides a transfer sleeve set on the supporting unit for mounting different types of supporting arm. Those supporting arms can be mounted on the supporting unit without removing the supporting unit from the desktop.

SUMMARY OF THE INVENTION

The main object of the present invention is to provide a transfer sleeve, which is detachably set on a supporting unit for mounting a supporting arm, the supporting unit, detachably penetrating through a plate and including a holder and a column disposed on the holder, the holder including a clamping element for abutting the plate, the supporting arm including a connecting hole. The transfer sleeve comprises: a first tube body including a first surrounding wall, a first top wall, and a first accommodating space, wherein the first surrounding wall and the first top wall are connected to each other and jointly define the first accommodating space; a second tube body including a second surrounding wall, a second top wall, an opening, and a second accommodating space, wherein the second surrounding wall and the second top wall are connected with each other and jointly define the second accommodating space, the second accommodating space is intercommunicated with the first accommodating space, the opening is formed on an edge of the second surrounding wall opposite to the second top wall; when the transfer sleeve is set on the supporting unit via the opening, the column is accommodated in the first accommodating space, and the holder is accommodated in the second accommodating space, and when the supporting arm is set on the transfer sleeve, the first tube body penetrates into the connecting hole.

In one embodiment, the second tube body further includes a fastening part formed on an inner surface of the second surrounding wall, and the holder further includes a fastener, wherein the fastening part is fastened to the fastener when the transfer sleeve is set on the supporting unit.

In one embodiment, the second tube body further has an extending block, the extending block extends from the second surrounding wall and toward the second top wall, the holder has a notch to which the extending block is aligned and engaged to the notch.

In one embodiment, the first tube body and the second tube body are cylindrical.

In one embodiment, a first inner diameter of the first tube body is slightly larger than a diameter of the column, and when the transfer sleeve is set on the supporting unit, an inner surface of the first surrounding wall and the column are close fitted to each other.

In one embodiment, the first inner diameter of the first tube body is smaller than a second inner diameter of the second tube body.

In one embodiment, the first tube body further includes a small diameter section and a large diameter section, wherein the small diameter section has a first outer diameter, the second surrounding wall has a second outer diameter, and the larger diameter section has a third outer diameter; the third outer diameter is larger than the first outer diameter and smaller than the second outer diameter.

In one embodiment, the second tube body further includes a protruding edge extending from the second surrounding wall and toward the first top wall, protruding out from the second top wall and being opposed to the large diameter segment; a groove is defined by the protruding edge, the second top wall, and the first tube body; the groove matches with the supporting arm.

In one embodiment, the second surrounding wall abuts against the clamping element.

In one embodiment, the material of the transfer sleeve is selected from the group consisting of polyetherketoneketone, polyethylene, and modified polyethylene.

In one embodiment, the first top wall has a flat portion and an inclined portion formed between the first surrounding wall and the flat portion.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative.

The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
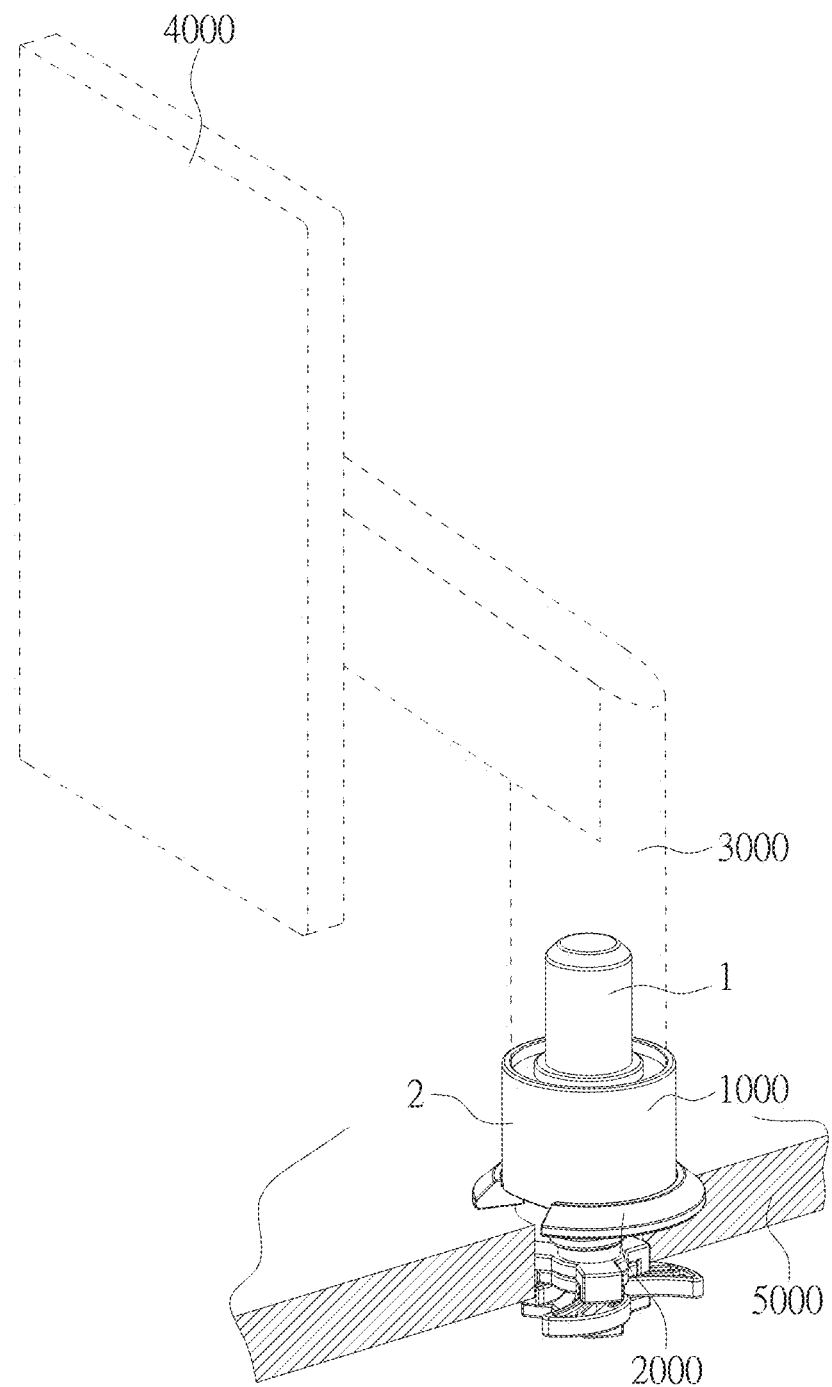
FIG. 1 is an application schematic view of a transfer sleeve of the embodiment of the present invention.

The application of the transfer sleeve 1000 of the present invention is illustrated in FIG. 1, wherein the transfer sleeve 1000 is detachably set on a supporting unit 2000 for mounting a supporting arm 3000, which is supporting a display 4000. Please refer to FIG. 5, the supporting unit 2000 penetrates through and is fixedly disposed to a plate 5000, and including a column 2001 and a holder 2002. The column 2001 is disposed on the holder 2002, the holder 2002 has a fastener 20021, a clamping element 20022, and a notch 20023. The supporting arm 3000 has a connecting column 3001 and a connecting hole 3002, wherein the connecting column 3001 is hollow.

Figure 2:
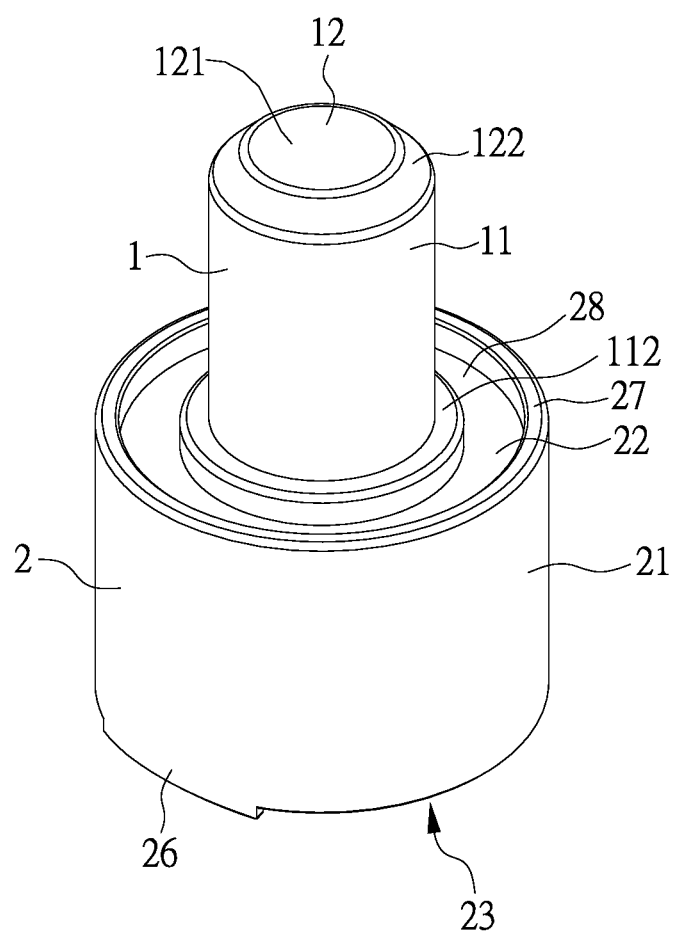
FIG. 2 is a perspective view showing transfer sleeve of the embodiment of the present invention.
Figure 3:
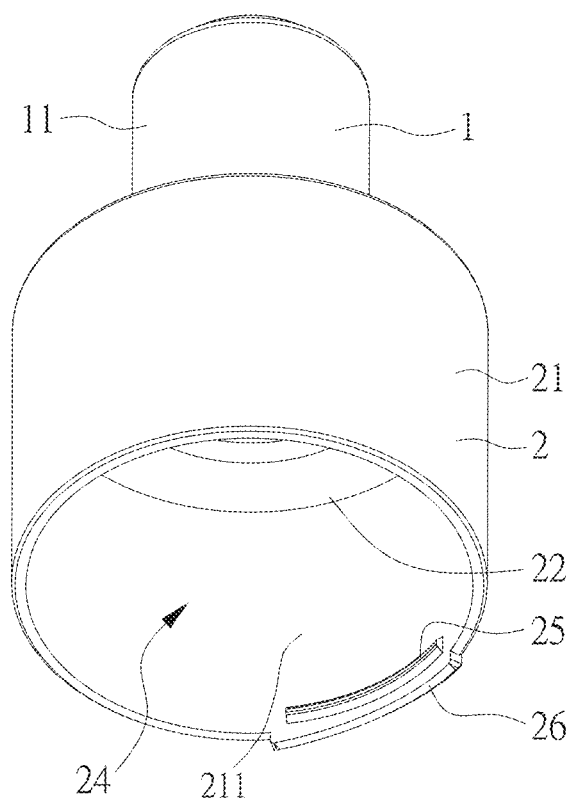
FIG. 3 is a perspective view showing the transfer sleeve of the embodiment of the present invention.
Figure 4:
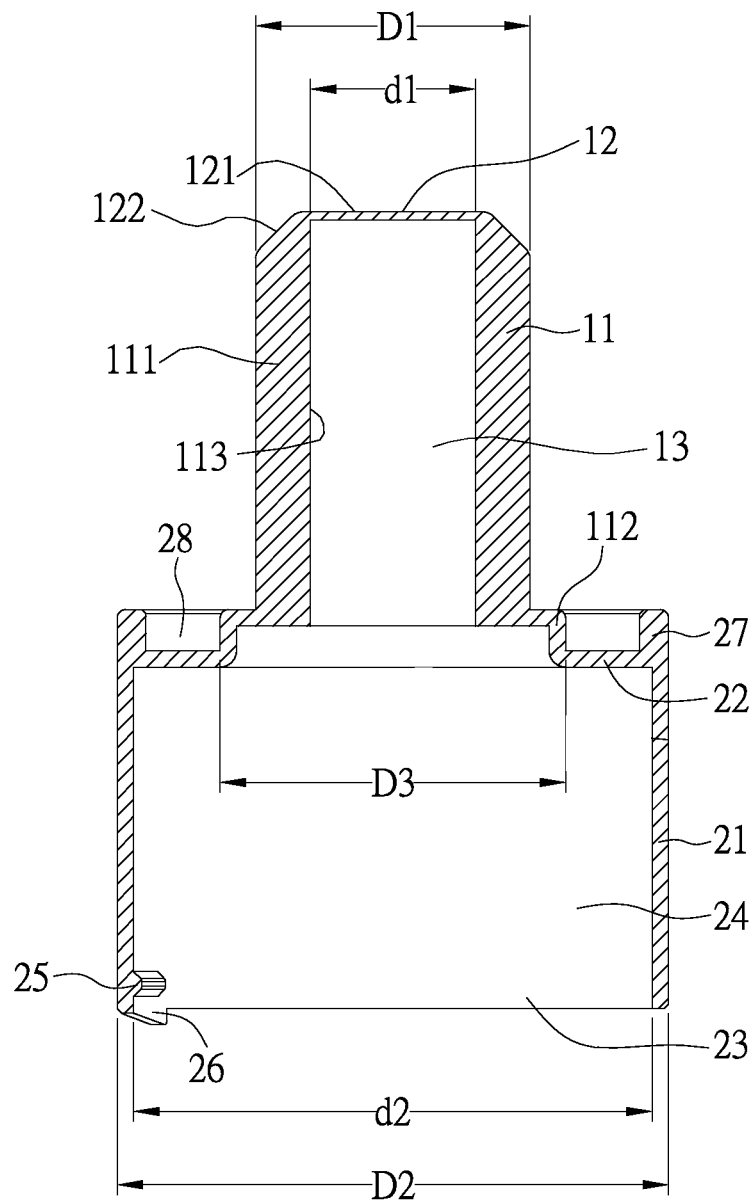
FIG. 4 is a cross-sectional view showing the transfer sleeve of the embodiment of the present invention.

Please refer to the perspective view of the transfer sleeve 1000 illustrated in FIG. 2 and FIG. 3, and refer to the cross-sectional view of the transfer sleeve 1000 illustrated in FIG. 4, wherein the transfer sleeve 1000 includes a first tube body 1 and a second tube body 2.

The first tube body 1 has a first surrounding wall 11, a first top wall 12, and a first accommodating space 13. The first surrounding wall 11 and the first top wall 12 are connected with each other and jointly define the first accommodating space 13. The first surrounding wall 11 has a small diameter section 111, a large diameter section 112 connected to the small diameter section 111, and an inner surface 113. The first top wall 12 has a flat portion 121 and an inclined portion 122, wherein the inclined portion 122 is formed between the first surrounding wall 11 and the flat portion 121. In the present embodiment, the first tube body 1 is cylindrical. The small diameter section 111 of the first surrounding wall 11 has a first outer diameter D1 and a first inner diameter d1. The large diameter section 112 has a third outer diameter D3, wherein the third outer diameter D3 is larger than the first outer diameter D1.

The second tube body 2 has a second surrounding wall 21, a second top wall 22, an opening 23, a second accommodating space 24, a fastening part 25, an extending block 26, a protruding edge 27, and a groove 28. The second surrounding wall 21 and the second top wall 22 are connected to each other and jointly define the second accommodating space 24. In the present embodiment, the second tube body 2 also is cylindrical. The second surrounding wall 21 has an inner surface 211, a second outer diameter D2, and a second inner diameter d2. The second top wall 22 is connected to the first tube body 1. The opening 23 is formed at an edge of the second surrounding wall 21 opposing the second top wall 22. The second accommodating space 24 and the first accommodating space 13 are intercommunicated. The fastening part 25 is formed on the inner surface 211 of the second surrounding wall 21 and close to the opening 23. The extending block 26 extends from the second surrounding wall 21 and away from the second top wall 22. The extending block 26 is adjacent and aligned to the fastening part 25. The protruding edge 27 extends from the second surrounding wall 21 and toward the first top wall 12, protrudes out from the second top wall 22, and is opposed to the large diameter section 112. The groove 28 is surrounded and defined by the protruding edge 27, the second top wall 22, and the large diameter section 112.

In the present embodiment, the first outer diameter D1 is smaller than the second outer diameter D2. Besides, the first inner diameter d1 is smaller than the second inner diameter d2. The first inner diameter d1 is slightly larger than a diameter D0 of the column 2001 of the supporting unit 2000; therefore, the inner surface 113 of the first surrounding wall 11 is close fitted to the column 2001 when the transfer sleeve 1000 is set on the supporting unit 2000 so that the transfer sleeve 1000 and the supporting unit 2000 can stably be engaged.

Figure 5:
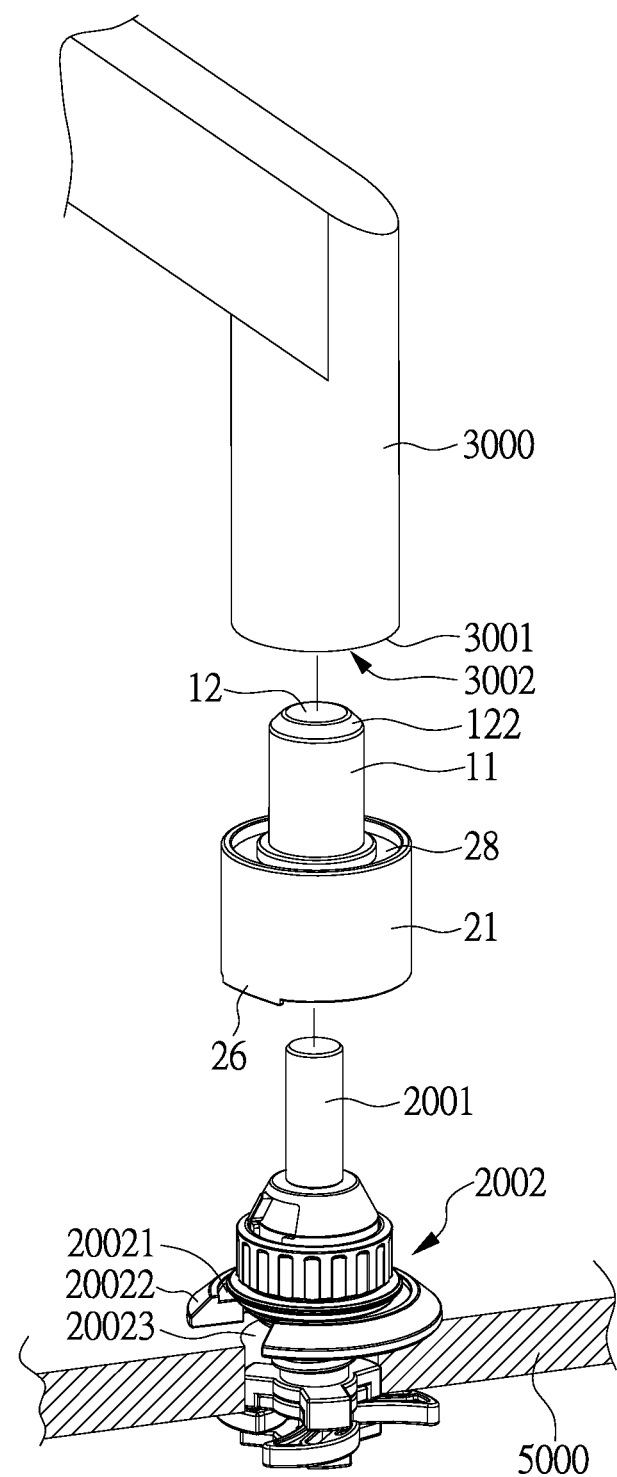
FIG. 5 is an application schematic view of the transfer sleeve of the embodiment of the present invention.
Figure 6:
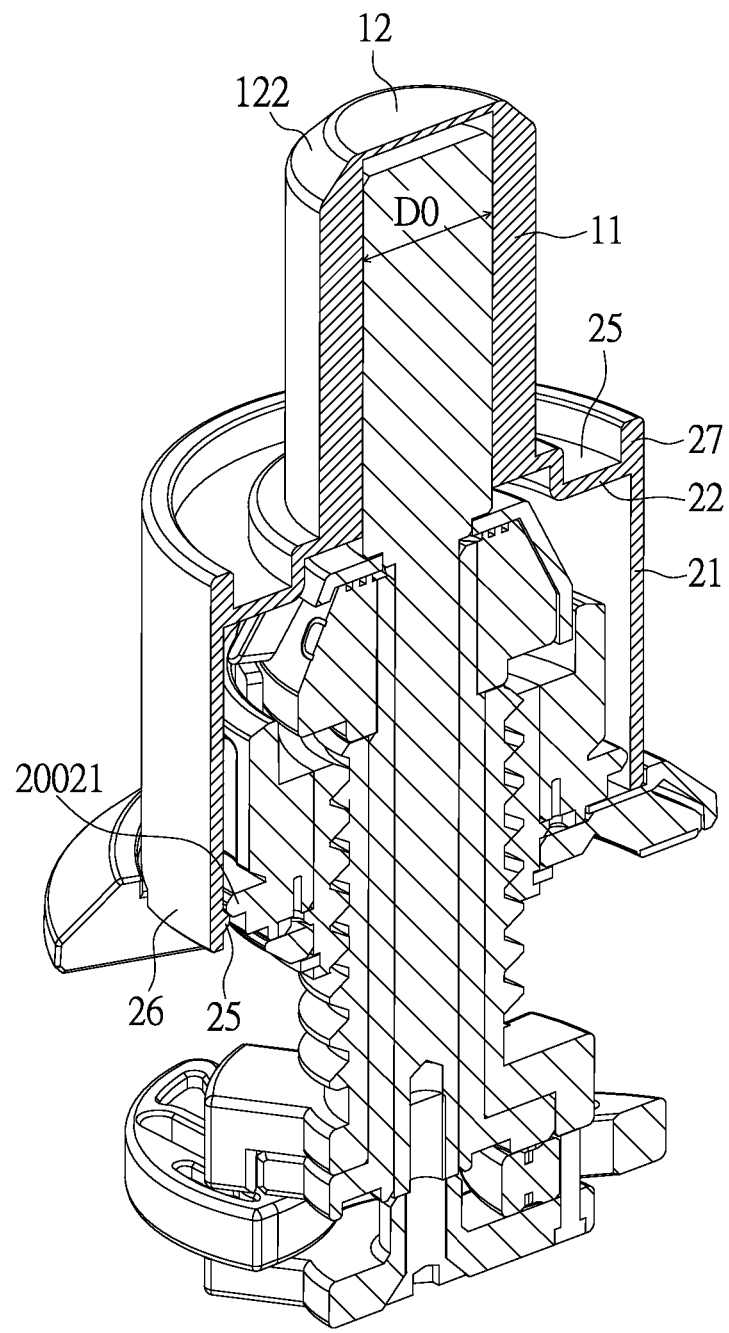
FIG. 6 is a cross-sectional view of the transfer sleeve mounted on the supporting unit of the embodiment of the present invention.

Referring to FIG. 5, the transfer sleeve 1000 is used for connecting the supporting unit 2000 set on the plate 5000 and the supporting arm 3000 supporting a display 4000. The assembly process includes aligning the extending block 26 of the transfer sleeve 1000 to the notch 20023 of the supporting unit 2000, wherein a portion of the supporting unit 2000 penetrates through the opening 23 and is accommodated in the first accommodating space 13 and the second accommodating space 24. In the meantime, a force is applied to push the transfer sleeve 1000 toward the supporting unit 2000 for fastening the fastening part 25 of the second tube body 2 and the fastener 20021 of the holder 2002. Please refer to FIG. 6, when the transfer sleeve 1000 is set on the supporting unit 2000, the inner surface 113 of the first surrounding wall 11 is closed fit to the column 2001, the column 2001 is accommodated in the first accommodating space 13, the holder 2002 is accommodated in the second accommodating space 24, the fastening part 25 is fastened to the fastener 20021 of the holder 2002, an edge of the second surrounding wall 21 adjacent to the opening 23 abuts against the clamping element 20022, the clamping element 20022 abuts against the plate 5000, and the extending block 26 corresponding to the notch 20023 is engaged to the notch 20023.

Afterward, the transfer sleeve 1000 is penetrated through the connecting hole 3002, so that the connecting column 3001 of the supporting arm 3000 is set on the first tube body 1 of the transfer sleeve 1000, extends into the groove 28, and is engaged to the groove 28. When the supporting arm 3000 is set on the transfer sleeve 1000, an inner sidewall of the connecting column 3001 is close fitted to the outer surface of the first surrounding wall 11, and an edge of the connecting column 3001 adjacent to the connecting hole 3002 is located in the groove 28 and contacts with the second top wall 22. In addition, the inclined portion 122 of the first tube body 1 can improve the convenience of setting the supporting arm 3000, for it is difficult to align the connecting hole 3002 with the first tube body 1 of the transfer sleeve 1000 when assembling the supporting arm 3000 by hand because the supporting arm 3000 is usually heavy and large. Therefore, the inclined portion 122 may guide the connecting column 3001, which is not yet aligned with the first tube body 1, to slide into a position that aligned with the first tube body 1 to finish the assembly process.

After assembling the supporting unit 2000, the transfer sleeve 1000, and the supporting arm 3000, the extending block 26 of the transfer sleeve 1000 is engaged to the notch 20023 so that the transfer sleeve 1000 is static with respect to the supporting unit 2000. However, the supporting arm 3000 may swivel horizontally with respect to the transfer sleeve 1000 for adjusting the horizontal position of the display 4000.

Besides, the transfer sleeve 1000 of the present invention is preferably made of plastic materials, such as polyetherketoneketone, polyethylene, modified polyethylene, or other plastic materials known in the art. The plastic materials can reduce abnormal sounds when using the transfer sleeve 1000. However, in other embodiments, the transfer sleeve 1000 may be made of materials other than plastic materials without particular limitation as long as certain strength can be provided.

The disassembly process is completed by applying a force to the transfer sleeve 1000 to dissociate the fastening part 25 and the fastener 20021 for removing the transfer sleeve 1000 from the supporting unit 2000.

In other embodiments of the present invention, the large diameter section 112 of the first tube body 1, the protruding edge 27 and groove 28 of the second tube body 2 may be selectively omitted without particular limitations according to the needs. In addition, the shape of the first tube body 1 and the second tube body 2 is not limited to a cylinder, but can be other shapes that fit the column 2001 of the supporting unit 2000 and the connecting hole 3001 of the supporting arm 3000.

According to the aforementioned embodiment, the supporting unit is capable of passing through a hole (hub hole) of a desktop and being fixed to the desktop but the hub hole can still collect the wires. Also, the transfer sleeve set on the supporting unit can be mounted directly by the supporting arm for bearing the display.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transfer sleeve, for being detachably set on a supporting unit and mounting a supporting arm, the supporting unit detachably penetrating through a plate and including a holder and a column disposed on the holder, the holder including a clamping element for abutting the plate, the supporting arm including a connecting hole, and the transfer sleeve comprising:
    a first tube body including a first surrounding wall, a first top wall, and a first accommodating space, wherein the first surrounding wall and the first top wall are connected to each other and jointly define the first accommodating space;
    a second tube body including a second surrounding wall, a second top wall, an opening, a second accommodating space, and a protruding edge extending from the second surrounding wall and toward the first top wall, protruding out from the second top wall, and being opposed to a large diameter section of the first tube body wherein the second surrounding wall and the second top wall are connected to each other and jointly define the second accommodating space, the second accommodating space is intercommunicated with the first accommodating space, the opening is formed on an edge of the second surrounding wall opposite to the second top wall, a groove is defined by the protruding edge, the second top wall, and the first tube body, and the groove matches with the supporting arm;
    when the transfer sleeve is set on the supporting unit via the opening, the column is accommodated in the first accommodating space, and the holder is accommodated in the second accommodating space, and when the supporting arm is set on the transfer sleeve, the first tube body penetrates into the connecting hole.

2. The transfer sleeve as claimed in claim 1, wherein the second tube body further includes a fastening part formed on an inner surface of the second surrounding wall, and the holder further includes a fastener, wherein the fastening part is fastened to the fastener when the transfer sleeve is set on the supporting unit.

3. The transfer sleeve as claimed in claim 2, wherein the second tube body further has an extending block, the extending block extends from the second surrounding wall and away from the second top wall, the holder has a notch, and the extending block is aligned and engaged to the notch.

4. The transfer sleeve as claimed in claim 3, wherein the first tube body and the second tube body are cylindrical.

5. The transfer sleeve as claimed in claim 4, wherein a first inner diameter of the first tube body is slightly larger than a diameter of the column, and when the transfer sleeve is set on the supporting unit, an inner surface of the first surrounding wall and the column are close fitted to each other.

6. The transfer sleeve as claimed in claim 5, wherein the first inner diameter of the first tube body is smaller than a second inner diameter of the second tube body.

7. The transfer sleeve as claimed in claim 6, wherein the first tube body further includes a small diameter section and the large diameter section, and wherein the small diameter section has a first outer diameter, the second surrounding wall has a second outer diameter, and the large diameter section has a third outer diameter, and the third outer diameter is larger than the first outer diameter and smaller than the second outer diameter.

8. The transfer sleeve as claimed in claim 1, wherein the second surrounding wall abuts against the clamping element.

9. The transfer sleeve as claimed in claim 1, wherein the material of the transfer sleeve is selected from the group consisting of polyetherketoneketone, and polyethylene.

10. The transfer sleeve as claimed in claim 1, wherein the first top wall has a flat portion and an inclined portion formed between the first surrounding wall and the flat portion.

* * * * *